US012605964B2

(12) United States Patent　　　(10) Patent No.: US 12,605,964 B2
Federici et al.　　　　　　　　　(45) Date of Patent: Apr. 21, 2026

(54) DISCONNECTOR ASSEMBLY FOR WHEEL HUB TRANSMISSION

(71) Applicant: Dana Motion Systems Italia S.r.l., Reggio Emilia (IT)

(72) Inventors: Fabrizio Federici, Reggio Emilia (IT); Michele Gobbi, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 856 days.

(21) Appl. No.: 17/854,100

(22) Filed: Jun. 30, 2022

(65) Prior Publication Data

US 2023/0015494 A1　　　Jan. 19, 2023

(30) Foreign Application Priority Data

Jul. 16, 2021　(DE) ..................... 20 2021 103 823.3

(51) Int. Cl.
| | |
|---|---|
| *F16D 1/10* | (2006.01) |
| *B60B 27/00* | (2006.01) |
| *B60K 17/02* | (2006.01) |
| *B60K 17/04* | (2006.01) |

(52) U.S. Cl.
CPC ........ *B60B 27/0026* (2013.01); *B60K 17/046* (2013.01); *B60B 2900/731* (2013.01); *F16D 2001/103* (2013.01)

(58) Field of Classification Search
CPC .............. B60K 17/046; B60B 27/0026; B60B 2900/731; F16D 11/02–11/16; F16D 2001/103
See application file for complete search history.

(56) References Cited

U.S. PATENT DOCUMENTS

| | | | | |
|---|---|---|---|---|
| 4,775,040 | A * | 10/1988 | Telford | ................... F16D 11/14 192/69.43 |
| 5,667,330 | A * | 9/1997 | Henkel | .................. B60K 17/28 403/328 |
| 8,424,625 | B2 | 4/2013 | Ishii | |
| 8,460,144 | B2 * | 6/2013 | Ziemer | ................. F16D 25/061 475/146 |
| 9,010,511 | B2 | 4/2015 | Eastman | |

(Continued)

FOREIGN PATENT DOCUMENTS

EP　　　　2647518 B1　　6/2015

*Primary Examiner* — Tinh T Dang
(74) *Attorney, Agent, or Firm* — McCoy Russell LLP

(57) ABSTRACT

A disconnector assembly for a wheel hub transmission where the wheel hub transmission may have an input shaft that receives an input torque from a drive unit. The disconnector assembly may have a first coupling portion driven by the input shaft, and a connector having a second coupling portion and being axially displaceable between a first axial position and a second axial position. Each of the first and second coupling portions may have at least two engagement sections and at least one disengagement section positioned between the engagement sections. The engagement sections of the first and second coupling portions may engage each other when the connector assumes the first axial position. When the connector assumes the second axial position, at least one engagement section of the first and second coupling portion may be received in the disengagement section of the respective other of the first and second coupling portion.

11 Claims, 3 Drawing Sheets

(56)          References Cited

U.S. PATENT DOCUMENTS

| | | | |
|---|---|---|---|
| 9,784,321 B2 | 10/2017 | Pritchard | |
| 11,498,418 B2 * | 11/2022 | Sanjotra | F16D 25/061 |
| 11,578,746 B2 * | 2/2023 | Stuut | E04B 1/585 |
| 2012/0031212 A1 * | 2/2012 | Forrest | F16D 11/14 |
| | | | 74/412 R |
| 2019/0048800 A1 * | 2/2019 | Patil | F16D 9/06 |

* cited by examiner

DISCONNECTOR ASSEMBLY FOR WHEEL HUB TRANSMISSION

FIELD

The present document concerns a disconnector assembly for a wheel hub transmission.

BACKGROUND

In the prior art, wheel hub transmissions are known that convert an input torque to an output torque applied to a wheel hub and thus to the wheel connected thereto. The wheel hub transmission may be provided within and/or as part of a wheel hub of a vehicle. It may be connectable to a drive unit that is directly connected to said specific wheel or to an axle to which the wheel is connected. Often, the wheel hub transmission comprises a planetary gear assembly. A system comprising such a wheel hub transmission and drive unit may thus be referred to as a planetary wheel drive or planetary track drive.

An example of a respective wheel hub transmission can be found in EP 2 647 518 B1.

When coupling a wheel to a drive unit by way of a wheel hub transmission, it can be difficult to rotate the wheel and thus to move the vehicle independently of the drive unit e.g. during towing. This is because the wheel does not only have to rotate the non-driven wheel hub transmission, but also has to overcome forces of inertia of the drive unit.

It is thus known to provide so-called disconnect devices or disconnector assemblies to selectively decouple the wheel hub transmission from the drive unit. As a result, a torque transmission between the wheel hub transmission and drive unit is interrupted and the wheel may rotate independently of and relative to the e.g. non-rotating drive unit. A disconnect device may e.g. comprise an axially displaceable connector that is coupled to an input shaft by splines in a first axial position. When moving the disconnect device to a second axial position, e.g. by pushing it from outside, the splines may disengage. This may include a respective (splined) engagement portion of the connector being pushed out of a corresponding (splined) engagement portion of the input shaft.

Such existing solutions are, however, typically large in size. For disengaging the splines, the connector has to be displaced by a distance that is at least equivalent to an axial length of the splines. A space has to be provided within the wheel drive for accommodating the disconnector also in said displaced state, this space having a great axial length.

SUMMARY

It is an object of the presently proposed disconnector assembly to increase the compactness of disconnector assemblies and of wheel drives comprising such disconnector assemblies.

This object is solved by the subject-matter according to the attached independent claims. Special embodiments are defined in the attached dependent claims.

An aspect of this disclosure is a disconnector assembly for a wheel hub transmission. The wheel hub transmission may comprise an input shaft that is configured to receive an input torque from a drive unit. The drive unit may be part of a wheel hub drive and/or may be arranged at or in the wheel hub. The drive unit may e.g. comprise an electric motor or hydraulic motor.

The disconnector assembly may comprise:
- a first coupling portion that is configured to be driven by the input shaft and/or that is connected to or comprised by the input shaft;
- a connector having a second coupling portion, the connector (and thus its second coupling portion) being axially displaceable e.g. relative to the first coupling portion between a first axial position (equivalent to an engaged state of the disconnector assembly) and a second axial position (equivalent to a disengaged state of the disconnector assembly),
- wherein each of the first and second coupling portions has at least two engagement sections and at least one disengagement section positioned between the engagement sections, wherein the engagement sections of the first and second coupling portions engage each other when the connector assumes the first axial position; and
- wherein, when the connector assumes the second axial position, at least one engagement section of the first and second coupling portion is received in the disengagement section of the respective other of the first and second coupling portion.

In the first axial position, torque transmission is possible between the engagement sections and thus coupling portions. In the second axial position, torque transmission is interrupted by (or, differently put, because of) one or more engagement section(s) of both coupling portions being received by disengagement section(s) to which typically no contact is established.

Differently put, when assuming the first axial position, the engagement sections of the first coupling portion may engage the engagement sections of the second coupling portion. This may include each engagement section of the first coupling portion engaging one (usually exactly one) engagement section of the second coupling portion, and vice versa, so that torque transmission is possible.

When assuming the second axial position, the engagement sections that were previously engaged may be disengaged from one another. Typically, there are no engagement sections that are in engagement with one another, i.e. the first and second coupling portions are decoupled in terms of torque transmission.

The disclosed solution helps to reduce the axial length of the overall wheel hub transmission and in particular of its disconnector assembly. This is because the required axial displacement for disengaging and/or (re-) engaging the coupling portions may be reduced compared to existing solutions. Specifically, in contrast to existing solutions, it may be sufficient to displace the connector by a reduced distance, namely by an axial length of only one engagement section instead of a combined axial length of both engagement sections (or by a generally greater axial length of a single continuous engagement section according to the prior art).

Generally, an engagement of engagement sections of the coupling portions with one another may also be referred to as or be equivalent to the coupling portions and/or the connector and input shaft being engaged and/or connected or coupled to one another. Also, a respective engagement of the engagement sections and/or coupling portions and/or connector and input shaft may result in a torque being transmittable between these elements.

In the second axial position, each disengagement section may receive an engagement section of the respective other coupling portion. It may be the case that at least one engagement section of any coupling portion may not be received by a respective disengagement section of the other coupling portions. Nonetheless, this engagement section may still be decoupled from the other coupling portion and especially not be in engagement with any section thereof. For doing so, it may generally be positioned at a (in particular radial) distance to said other coupling portion. Specifically, a distance or gap may be formed between said engagement section and the other coupling portion in a direction orthogonal to the connector's displacement axis and/or in a vertical direction when the disconnector assembly is mounted to a vehicle.

The connector may be connected to a gear assembly as described later herein. In its first axial position, the connector may be coupled to said gear assembly for transmitting a torque thereto that the connector receives from the input shaft. In the second axial position, the connector may still be coupled to said gear assembly (or alternatively may be decoupled therefrom). In one example, the connector is coupled to the gear assembly in the second axial position to a lesser extent compared to the first axial position, e.g. due to a length of a mechanical engagement between the connector and gear assembly being reduced. In any case, due to no longer receiving a torque from the input shaft, the connector may no longer transmit any torque to the gear assembly when assuming the second axial position. As a result, the gear assembly may rotate independently of and/or relative to the input shaft and drive unit.

Any disengagement section may be configured to not engage with the respective other of the first and second coupling portion and specifically with any engagement section thereof. Accordingly, no torque may be transmitted between the coupling portions by way of their disengagement sections. For example, an engagement section of one of the first and second coupling portion that is received (or, differently put, arranged or positioned) in a disengagement section of the respective other coupling portion may remain at a (radial) distance to and thus decoupled from said disengagement section. This prevents torque transmission.

The axis along which the connector is displaceable may be a rotational axis about which the input shaft and/or wheel and/or at least one gear of the gear assembly rotates. When referring to radial extensions or directions herein, this may relate to a respective radial and/or orthogonal extension with respect to said displacement axis.

In one example, the engagement sections of any of the first and second coupling portion are positioned at the same radial heights and/or have the same radial dimensions. The disengagement section of said coupling portion may have a different radial dimension or radial height. Specifically, it may be provided at a greater radial distance to the respective other coupling portion than the engagement sections. In fact, the engagement sections may have a radial distance of zero to said other coupling portion in order to engage therewith. The disengagement section usually has a distance different from zero to said other coupling portion and in particular to the engagement sections thereof.

The axial length of the engagement sections of each coupling portion may be similar to one another. Additionally or alternatively, at least one of the engagement sections of each coupling portion may have the same or a smaller axial length than the disengagement portion of said coupling portion. In one example, all engagement sections of both coupling portions may have identical axial lengths or axial lengths deviating from one another by not more than 10%. By choosing the axial lengths according to any of the previous aspects, a compact axial design is achieved which limits the necessary extent of axial displacements.

In the second axial position, at least one engagement section of the first coupling portion may be received in the disengagement section of the second coupling portion, and at least one engagement section of the second coupling portion is received in the disengagement section of the first coupling portion. This is an effective way of disengaging the coupling portions which is marked by a reduced axial length of the required displacement.

Generally, the disengagement sections of the coupling portions may be aligned with one another and/or may be arranged at a common axial position (e.g. may axially at least partially overlap one another) when the connector is in its first axial position. In the second axial position, the disengagement sections may no longer be aligned. Instead, the disengagement section of the second coupling portion of the connector may be axially displaced and may receive (i.e. may be axially aligned with) an engagement section of the first coupling portion. This, too, helps to reduce the extent of required axial displacements.

The disengagement section may be configured as a recess. In particular, the recess may be a circumferentially extending groove and/or a ring-shaped groove. This may be beneficial in terms of production while reliably providing the desired disengagement function.

The engagement sections may each comprise splines. Specifically, they may be configured as or have spline-structures. The splines may e.g. extend in an axial direction. Thus, the coupling portions may form a spline coupling when engaged. This enables a reliable engagement and disengagement by way of axial displacement.

According to a further aspect, in each of first and second coupling portion, the disengagement section may be directly adjacent to the engagement sections and/or may (axially) separate the engagement sections from one another. This reduces the axial displacement needed for decoupling the coupling portions as an engagement section may directly be received in an axially adjacent disengagement section of the respective other coupling portion.

One embodiment provides that the at least one engagement section (that is received in the displacement section when assuming the second axial position) is axially displaced to disengage an engagement section of the respective other of the first and second coupling portion (i.e. the engagement section with which it engages in the first axial position) and is received by the disengagement section instead.

The wheel hub transmission may further comprise a gear assembly that is configured to convert torque transmitted thereto by the input shaft to a (possibly greater) output torque. The gear assembly may comprise a planetary gear stage and the connector may be connected to or comprises a gear of the planetary gear stage, in particular wherein said gear is a sun gear. Generally, the connector may be configured as a rotatable shaft and/or may connect the input shaft and gear stage and transmit a torque therebetween in its first axial position.

The disconnector assembly may further comprise a cover having a protruding portion and being mountable with and/or arrangeable in a first orientation and a (different) second orientation. The cover may e.g. cover an opening through, into or towards which the protruding portion may extend in at least one of the orientations. Also, the connector and/or a displaceable member (e.g. a pin) coupled thereto may extend through, into or towards said opening, e.g. from an inner side of the opening facing away from the cover. Therefore, by way of said opening, the protruding portion and connector and/or displaceable member may be coupled to and in particular may contact one another. This enables exerting a displacement force by the protruding portion on the connector and/or displaceable member.

The cover may define part of an outer surface of the wheel hub transmission or wheel hub. It may thus be easily accessible from outside the wheel hub transmission.

The cover may be fixable in both its first and second orientation. For doing so, it may comprise at least one fixing section that is aligneable with a fixing section provided at some other (normally covered) portion of the wheel hub transmission and/or disconnector assembly. Said covered portion may be comprised by the wheel hub and/or may be covered by the cover in at least one of its orientations.

For example, at least one of the cover and covered portion may comprise a first and a second fixing section. The first fixing section may be aligneable with a fixing section of the respective other of the cover and covered portion in the cover's first orientation. The second fixing section may be aligneable with the same or another fixing section of the respective other of the cover and covered portion in the cover's second orientation. Any fixing section may be or comprise a hole. Especially in case of the cover, any fixing section may be configured as a through-hole, whereas any fixing section of the covered portion may be configured as a threaded hole. Therefore, a threaded bolt or screw may be inserted through a fixing section of the cover and into a fixing section of the covered portion to fix the cover thereto.

The covered portion may comprise at least one recess for receiving the protruding portion. A first recess may be provided for receiving the protruding portion in the first orientation and a second recess may be provided for receiving the protruding portion in in the second orientation. Alternatively, one common or continuous recess that is e.g. elongated and/or curved may be provided for receiving the protruding portion in both of the first and second orientation. This may enable rotating the cover relative to the recess and/or covered portion for changing between the first and second orientation with at least part of the protruding portion remaining in the recess. This way, the cover does not have to be fully removed and reoriented. Instead, it only has to be loosened so as to be able to rotate it.

Generally, the cover and more specifically its protruding portion may be configured to exert a displacement force onto the connector. Said force may be provided in only one of the first and second orientation and/or may be significantly greater in one of the first and second orientation compared to the respective other orientation.

In consequence, a (displacement) force that is exertable by the protruding portion onto the connector may change between the first and second orientation (e.g. from 0% to 100%) so that, depending on the cover's orientation, the connector is displaceable between the first and second axial position.

In order to change between the first and second axial position, the cover may be rotatable about a rotational axis which extends in parallel (but e.g. at a distance) to the axis along which the connector is displaceable.

The protruding portion may be an (e.g. axially) inwardly protruding portion. An axially inward direction may be defined as extending from an outer portion of the wheel hub towards the input shaft and/or extending from the gear assembly towards the input shaft.

The protruding portion and/or any fixing section of the cover may be positioned (radially) offset from a geometric center of the cover and/or from the rotational axis about which the cover is rotated to change between its first and second orientation.

In sum, by providing a cover according to one of the above aspects, a simple and reliable mechanism is provided for coupling and decoupoling the input shaft and gear assembly by way of the connector and/or for axially displacing said connector. Advantageously, only one fixing member (e.g. a bolt) may have to be loosened or tightened and/or only a relatively simple change of orientation of the cover may have to be implemented. This increases user-friendliness.

Further, the cover disclosed herein helps to reduce axial dimensions of the overall wheel hub transmission and/or wheel drive. This is because of its inwardly protruding portion, in particular when said protruding portion is received in a recess of the above kind.

According to a further aspect, the disclosure also concerns a disconnector assembly for a wheel hub transmission, the wheel hub transmission comprising an input shaft that is configured to receive an input torque from a drive unit; the disconnector assembly comprising:

a connector that is displaceable along an axis between a first axial position, in which the connector is coupled to the input shaft for receiving torque therefrom, and a second axial position in which the connector is decoupled from the input shaft (e.g. in terms of torque transmission);

a cover having a (typically inwardly) protruding portion and being arrangeable in a first orientation and a second orientation, wherein an axial (displacement) force is exertable by the protruding portion onto the connector, said force changing between the first and second orientation so that, depending on the cover's orientation, the connector is displaceable between the first and second axial position; and wherein, for changing between the first and second axial position, the cover is rotatable about a rotational axis which extends non-orthogonally and typically in parallel to the axis along which the connector is displaceable.

Any of the embodiments, developments and variants disclosed herein with respect to the disconnector assembly and the cover may be valid for and/or apply to the disconnector assembly of said further aspect as well. That is, any embodiments, developments and variants discussed herein with respect to the same or similar features may apply to the respective features (and especially the cover) of the disconnector assembly of said further aspect as well. Yet, according to said further aspect the connector and input shaft do not necessarily have to comprise coupling portions having a plurality of engagement sections and/or a disengagement section. Instead, they may be coupled to one another by a single continuous spline coupling known from the prior art.

For example, the connector and input shaft may each have (typically exactly) one (usually axially continuous) engagement structure e.g. comprising splines. By engaging these engagement structures along their complete axial length, torque can be transmitted. By displacing them by their axial lengths relative to one another, the engagement structures can be disengaged and torque transmission can be interrupted. While this may require an increased axial displacement compared to the above aspect comprising disengagement sections, the axial length may still be reduced compared to existing solutions by using the cover disclosed herein.

Also disclosed is a method for operating a disconnector assembly for a wheel hub transmission, the wheel hub transmission comprising an input shaft that is configured to receive an input torque from a drive unit;

7                                                                                                  8 the disconnector assembly comprising:

a first coupling portion that is configured to be driven by the input shaft and/or connected to or comprised by the input shaft;

a connector having a second coupling portion and being axially displaceable between a first axial position and a second axial position, wherein each of the first and second coupling portions has at least two engagement sections and at least one disengagement section positioned between the engagement sections, the engagement sections of the first and second coupling portions engaging each other when the connector assumes the first axial position, e.g. so that a torque is transmittable between the coupling portions;

the method comprising: axially displacing the connector so that it assumes the second axial position, wherein in said second axial position, at least one engagement section of the first and second coupling portion is received in the disengagement section of the respective other of the first and second coupling portion.

Embodiments of the present solution are discussed below with respect to the attached schematic drawings.

DETAILED DESCRIPTION

Figure 1:
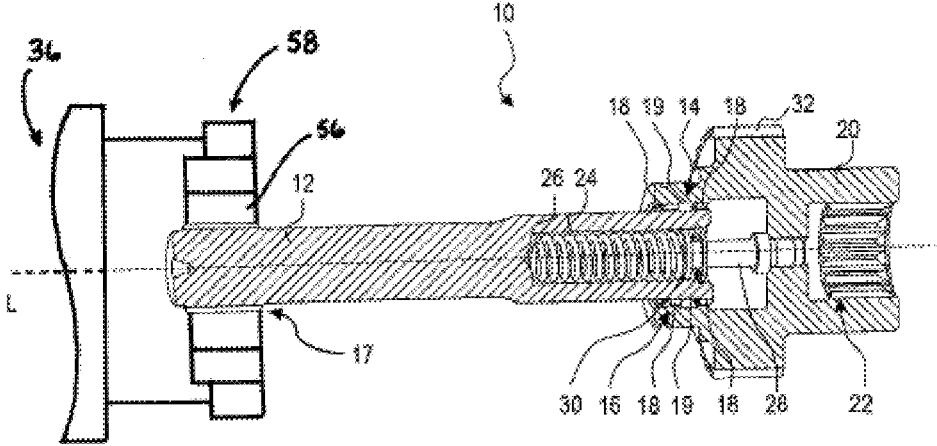
FIG. 1 is a schematic sectional view of a disconnector assembly and a wheel hub transmission according to a first embodiment, the disconnector assembly assuming an engaged state.

FIG. 1 is a schematic partial sectional view of a disconnector assembly 10 and a wheel hub transmission 36 according to a first embodiment. In FIG. 1, the disconnector assembly assumes an engaged state in which a torque is transmittable by the disconnector assembly.

The disconnector assembly 10 is part of a wheel drive of a vehicle. The wheel drive comprises a wheel hub transmission 36 (non-depicted) that usually comprises a planetary gear stage 58 (non depicted). The wheel hub transmission 36 is typically configured to convert a received input torque into a greater output torque while reducing a speed of rotation.

The disconnector assembly 10 comprises a connector 12. As a mere example, the connector 12 is configured as an elongated shaft that extends along a longitudinal axis L. The longitudinal axis L also represents a rotational axis about which the connector 12 rotates in its engaged state.

At a first (axial) end portion, the connector 12 comprises a second coupling portion 16. At a second (axial) end portion, the connector comprises a gear coupling portion 17 for coupling to the planetary gear stage 58 of the wheel hub transmission 36. In one example, the gear coupling portion 17 forms part of a spline coupling for coupling to the sun gear 56 of said planetary gear stage 58 or, differently put, for linking the shaft-like connector 12 and the sun gear 56.

The disconnector assembly 10 further comprises a first coupling portion 14. In the engaged state, the first and second coupling portions 14, 16 are engaged with one another so that a torque may be transmitted therebetween. The first coupling portion 14 is comprised by an input shaft 20 that is connected to a non-depicted drive unit. The input shaft 20 comprises inner splines 22 for connecting to said drive unit. The input shaft 20 may be, but does not have to be, part of the disconnector assembly 10.

Usually, the first coupling portion 14 and said splines 22 are provided at opposite axial ends of the input shaft 20. The axial end comprising the first coupling portion 14 faces and typically overlaps with the connector 12.

Only by way of example, the first coupling portion 14 is provided at an inner circumferential face of the input shaft 20 concentrically extending about the longitudinal axis L. The second coupling portion 16 is provided at an outer circumferential face of the connector 12 concentrically extending about the longitudinal axis L. Said outer circumferential face is received and/or surrounded by said inner circumferential face. Specifically, an axial end portion of the connector 12 comprising the second coupling portion 16 is inserted into the end portion of the input shaft 20 comprising the first coupling portion 14. In consequence, the connector 12 and input shaft 20 and in particular their first and second coupling portions 14, 16 axially overlap one another.

Note that the cross-sectional plane of FIG. 1 includes the longitudinal axis L and generally cuts the connector 12 and the input shaft 14 in half. Other members, such as a member 28 discussed below, are depicted in full, i.e. are not shown in a cross-sectional view.

According to a non-depicted alternative, the second coupling portion 16 may be provided at an inner circumferential face of the connector 12 and the first coupling portion 14 may be provided at outer circumferential face of the input shaft 20. Said outer circumferential face may at least partially be arranged in or inserted into said inner circumferential face.

Each coupling portion 14, 16 comprises two engagement sections 18 and one disengagement section 19. This can be seen particularly well in FIG. 2. The engagement sections 18 comprise splines extending along the longitudinal axis L. The splines may be distributed at equal distances from one another along the outer circumference of the connector 12 and the inner circumference comprising the second coupling portion 14, respectively. The splines of the adjacent engagement sections 18 of each coupling portion 14, 16 are aligned with one another.

The disengagement section 19 of each coupling portion 14, 16 is provided directly in between (i.e. is axially directly adjacent to) the engagement sections 18 of said respective coupling portion 14, 16. Differently put, the disengagement section 19 of each coupling portion 14, 16 is axially sandwiched between the engagement sections 18 of said coupling portions 14, 16.

The disengagement section 19 of each coupling portion 14, 16 is a circumferentially extending ring-shaped groove. It may also be referred to as a circumferential slot within a respective coupling portion 14, 16.

There may be more engagement sections 18 and disengagement sections 19 than depicted in FIG. 1. For example, a larger number of axially adjacent engagement sections 18 may be provided, wherein directly adjacent engagement sections 18 are each separated by a disengagement section 19.

With respect to the first coupling portion 14, the disengagement section 19 has a greater radial distance from the longitudinal axis L than the engagement sections 18 of said first coupling portion 14. With respect to the second coupling portion 16, the disengagement section 19 has a smaller radial distance from the longitudinal axis L compared to the engagement sections 18 of said second coupling portion 16.

As a mere optional feature, the connector 12 further comprises an axially extending inner recess 24 at its end portion comprising the second coupling portion 16. In said inner recess 24, a spring 26 is provided that is compressible in accordance with an axial displacement of the connector 12. The compression and thus the spring forces may increase when displacing the connector 12 to assume its second axial position discussed below. Accordingly, the connector 12 is typically resiliently pre-stressed into its first axial position.

As further optional features, an inner shaft assembly 28 is provided that is fixed to the input shaft 20 so as to be non-rotatable and non-displaceable relative thereto. The inner shaft assembly 28 may comprise a single inner shaft member or a succession of inner shaft members resting against one another. It comprises a spring seat 30 against which the spring 26 rests. The connector 12 is axially displaceable relative to the inner shaft assembly 28 under compression or decompression of the spring 26.

A further optional feature is an outer circumferential toothing 32 of the input shaft 20. According to known configurations, this may be part of an otherwise non-depicted parking brake mechanism.

In the engaged state of FIG. 1, each engagement section 18 of the first and second coupling portion 14, 16 is axially aligned with and/or axially overlaps with and/or engages an engagement section 18 of the respective other of the first and second coupling portion 14, 16. As a result, a torque can be transmitted between the engaged engagement sections 18.

Likewise, in the engaged state of FIG. 1, each disengagement section 19 of the first and second coupling portion 14, 16 is axially aligned with and/or axially overlaps with an disengagement section 19 of the respective other of the first and second coupling portion 14, 16. As a result, no engagement section 18 of the respective other coupling portion 14, 16 is received in one of the disengagement sections 19.

In case of a larger number of engagement sections 18 and disengagement sections 19, the above usually relates to each engagement section 18 and each disengagement section 19 in the engaged state.

Figure 2:
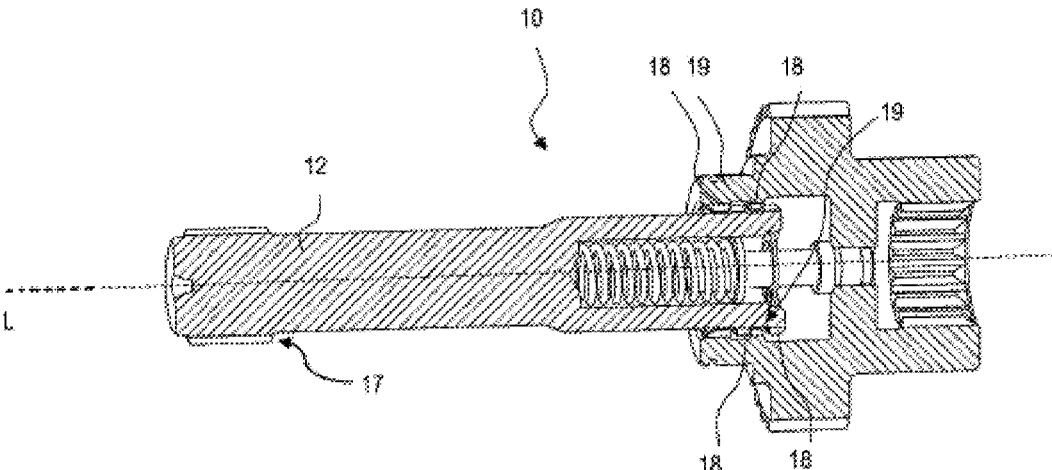
FIG. 2 is a schematic sectional view of the disconnector assembly of FIG. 1 in a disengaged state.

FIG. 2 depicts the disengaged state of the disconnector assembly 10 in which the connector 12 has, compared to FIG. 1, been displaced to the right along the longitudinal axis L. Thus, it assumes a second axial position. The displacement for changing between the first and second axial position may amount to at most or less than 30 mm, to at most or less than 15 mm or to at most or less than 5 mm.

In said disengaged state, the engagement sections 18 of the first and second coupling portions 14, 16 no longer engage one another. Instead, one engagement section 18 of each first and second coupling portion 14, 16 is received in (i.e. is axially aligned with and/or axially overlaps with) a disengagement section 19 of the respective other coupling portion 14, 16. The respective other engagement section 18 of each first and second coupling portion 14, 16 is equally positioned at a distance from a radially opposite portion of the connector 12 or input shaft 20. In FIG. 2, this concerns the right engagement section 18 of the connector 12 and the left engagement section 18 of the first coupling portion 14.

Therefore, no torque is transmittable by the input shaft 20 to the connector 12 and these members may instead rotate relative to one another. On the other hand, the gear coupling portion 17 of the connector 12 may still remain in engagement with a non-depicted gear assembly, albeit with a reduced axial length of said engagement.

From a comparison of FIGS. 1 and 2, it becomes evident that an axial displacement necessary for disengaging the connector 12 and first coupling portion 14 is limited to an axial length of the engagement sections 18. This axial displacement may be considerably lower compared to existing continuous (i.e. non-circumferentially slotted) spline-type engagement sections that are configured similarly to the depicted gear coupling portion 17. These have to be displaced by their full axial lengths in order to achieve a disengagement.

Note that providing an axial succession of short engagement sections 18 may not necessarily weaken the coupling between the connector 12 and first coupling portion 14 compared existing longer continuous engagement sections. This is because such existing engagement sections are often overdimensioned so that providing slot-like disengagement sections 19 may not unduly weaken them. Further, even if that was the case, such a potential weakening may be compensated for by radially enlarging the disclosed engagement sections 18 instead of axially elongating them. This way the reduced axial displacement of the disclosed solution can still be achieved, thereby improving axial compactness.

Figure 3:
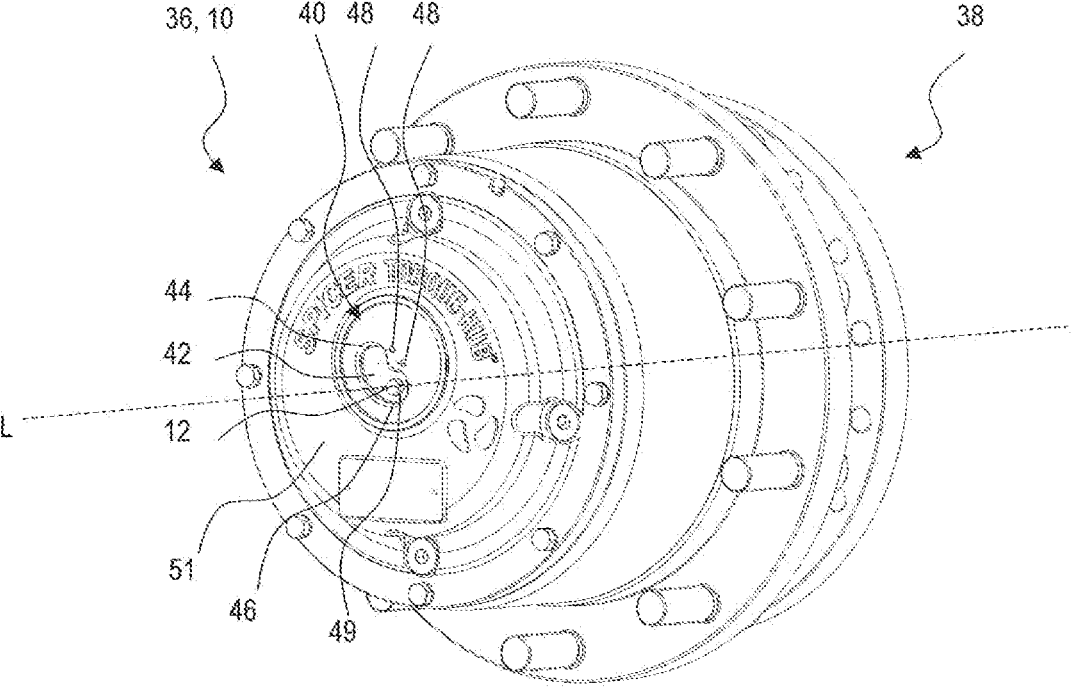
FIG. 3 is a perspective view of a wheel hub comprising the disconnector assembly of FIGS. 1 and 2 with an additional cover being removed from the wheel hub.
Figure 4:
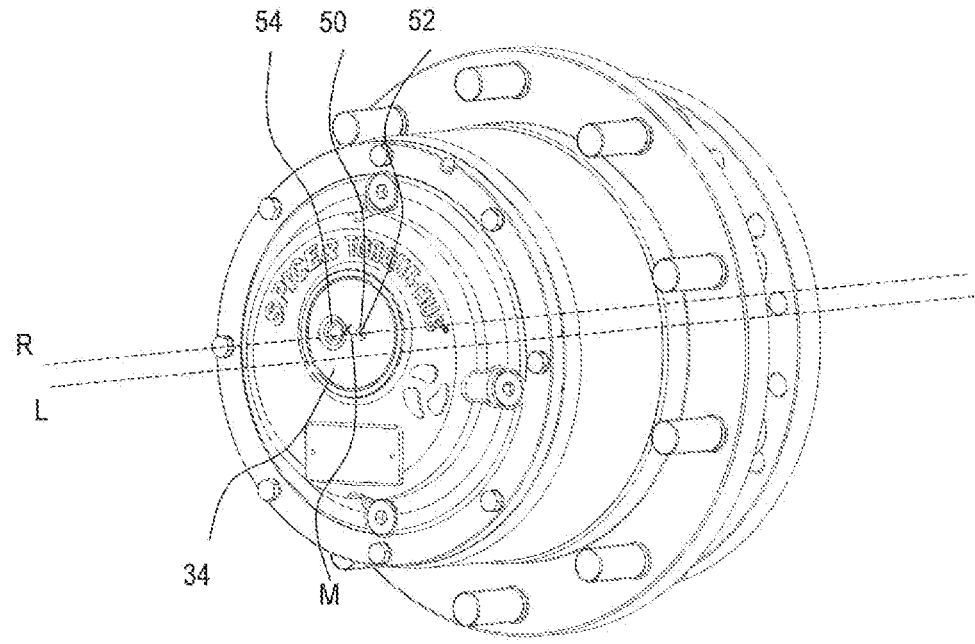
FIG. 4 is a perspective view similar to FIG. 3 with the additional cover being mounted to the wheel hub and assuming a first orientation.
Figure 5:
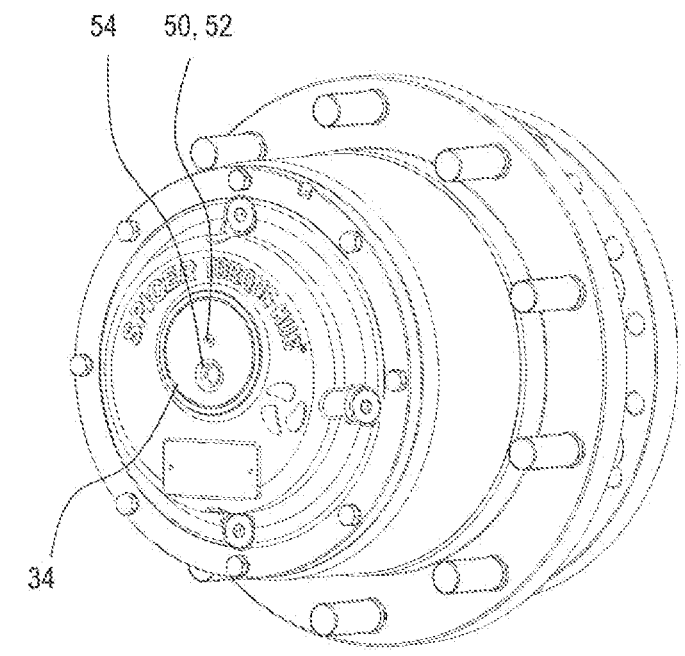
FIG. 5 is a perspective view similar to FIG. 4 with the additional cover assuming a second orientation.

FIGS. 3 to 5 show details of a cover 34 that is mountable to a wheel hub transmission 36 that comprises the disconnector assembly 10 of FIGS. 1-2. More precisely, a complete wheel hub 38 is shown which comprises a wheel hub transmission 36.

In FIG. 3, the cover 34 is removed. Therefore, an exposed portion of the wheel hub transmission 36 that represents a (normally) covered portion 40 can be seen. This covered portion 40 is accessible from outside, e.g. by an operator of the vehicle that comprises the wheel hub transmission 38. The covered portion 40 comprises an elongated continuous recess or groove 42 having an upper end portion 44 and a lower end portion 46. As a mere example, the groove 42 has a curved or kidney-like shape. It extends at a distance to but along an outer circumference of the circular normally covered portion 40. Note that said normally covered portion 40 is non-rotatable so that a non-depicted wheel that is mounted to the wheel hub transmission 36 rotates relative thereto.

At the lower end portion 46 of the groove 42, an end face of the connector 12 adjacent to or comprising the gear coupling portion 17 is exposed by extending through an opening 49. Alternatively, an intermediate member, such as a pin that rests against said end face of the connector 12 is exposed. An extension of the longitudinal axis L of FIGS. 1 and 2 is indicated in FIG. 3 as well.

The normally covered portion 40 further comprises at least one and in the depicted case two fixing sections 48. These are configured as threaded holes.

Generally, in FIG. 3 it can be seen that the normally covered portion 40 is substantially flush with and does not axially protrude out of the surrounding outer surface 51 of the wheel hub 38.

FIG. 4 shows the cover 34 when mounted to the normally covered portion 40 with a first orientation. The cover 34 covers the normally covered portion 40 which is thus no longer visible and accessible from outside the wheel hub 38. The cover 34 comprises a fixing section 50 that is configured as a typically non-threaded through hole. In the depicted first orientation, this fixing portion 50 is aligned with the lower fixing portion 48 of the exposed part 40 in FIG. 3. Therefore, a bolt 52 can be inserted into said aligned fixing portions 48, 50 for fixing the cover 34 to the exposed part 40.

The cover comprises an inwardly protruding portion 54. "Inwardly" e.g. means protruding in the direction of the disconnector assembly 10 and/or in a direction towards the interior of the wheel hub 38, e.g. along the axis L.

In the first orientation of FIG. 4, the inwardly protruding portion 54 is near or at the upper end portion 44 of the groove 42 of FIG. 3. There, it typically does not exert any forces on the disconnector device 10 and is generally placed at a distance to the opening 49. The disconnector device 10, e.g. as a result of the pre-tensioning of the spring 26, thus assumes its first axial position of FIG. 1.

FIG. 5 depicts the cover 34 when mounted to the wheel hub 38 with a second orientation. For assuming said second orientation, the cover 34 is, as a mere example, rotated in an anti-clockwise direction by e.g. 90°.

Note that an axis of orientation R about which the cover of 34 is rotated extends in parallel to but at a distance to the axis L. Further, the inwardly protruding portion 54 is placed at a distance to said rotation axis R and at a distance to a geometric center M of the cover 34 that is intersected by said rotation axis R. The same applies to the fixing section 50 of the cover 34. Therefore, when rotating the cover 34 about the rotation axis R, the fixing section 50 and inwardly protruding portion 54 can be positioned in the manner described herein.

In said second orientation, the fixing section 50 is aligned with the upper fixing section 48 of the covered portion 40 in FIG. 3. Therefore, the bolt 52 is inserted in these respectively aligned fixing sections 50, 52.

Further, in said second orientation, the inwardly protruding portion 54 is positioned near or at the lower end portion 46 of the groove 42 of FIG. 3. Therefore, it comes into contact with the exposed end of the connector 12 and/or an optional pin provided as an intermediate member. As a result, the inwardly protruding portion 54 exerts an axial force onto the connector 12 (either directly or via the optional pin). Said axial force is directed inwardly, so that the connector 12 is pushed inwardly and thereby assumes its second axial position of FIG. 2.

As a result, depending on the selected first or second orientation of the cover 34, the connector 12 can be moved between and maintained in its first and second axial position. Changing the orientation of the cover 34 is, from a user's perspective, simple as only one fixing member (bolt 52) has to be released. Further, changing the cover's 34 orientation is simple by merely having to rotate it e.g. by 90° and possibly without even lifting it away from the wheel hub 38. Instead, the groove 42 may even act as a guiding structure that, due to receiving and guiding the inwardly protruding portion 54, guides a rotation of the cover 34 between the first and second orientation. Also, the end portions 44, 46 may act as stop surfaces which, when contacting the cover 54, may ensure that the fixing sections 48, 50 are aligned with one another.

Still further, the cover 34 is marked by a substantially flat shape apart from the inwardly protruding portion 54. Yet, because of said flat shape and the inward protrusion, the cover 34 does not significantly add to the axial length of the wheel hub 38. Rather, much like the exposed part 40, it can be substantially flush with a surrounding surface 51 of the wheel hub 38. A contribution to the axial length of the wheel hub 38 can thus essentially be limited to a material thickness of the cover 34. This improves axial compactness of the disconnector assembly 10 and thus of the wheel hub 38.

The invention claimed is:

1. A disconnector assembly for a wheel hub transmission, wherein the wheel hub transmission comprises an input shaft that is configured to receive an input torque from a drive unit;

the disconnector assembly comprising:

a first coupling portion that is configured to be driven by the input shaft;

a connector having a second coupling portion and being axially displaceable between a first axial position and a second axial position, wherein each of the first and second coupling portions has at least two engagement sections and at least one disengagement section positioned between the engagement sections, wherein the engagement sections of the first and second coupling portions engage each other when the connector is in the first axial position; and wherein, when the connector is in the second axial position, at least one engagement section of the first and second coupling portions is received in the disengagement section of the respective other of the first and second coupling portions.

2. The disconnector assembly according to claim 1, wherein, in the second axial position, at least one engagement section of the first coupling portion is received in the disengagement section of the second coupling portion, and at least one engagement section of the second coupling portion is received in the disengagement section of the first coupling portion.

3. The disconnector assembly according to claim 1, wherein the disengagement section is configured as a recess, wherein the recess comprises a circumferentially extending groove.

4. The disconnector assembly according to claim 1, wherein the engagement sections each comprise splines.

5. The disconnector assembly according to claim 1, wherein, in each of first and second coupling portion, the disengagement section is directly adjacent to the engagement sections and/or separates the engagement sections from one another.

6. The disconnector assembly according to claim 1, wherein when moving from the first to the second axial position at least one engagement section of the second coupling portion is axially displaced, thereby disengages an engagement section of the first coupling portion and is received by the disengagement section of said first coupling portion instead.

7. The disconnector assembly according to claim 1, wherein the wheel hub transmission further comprises a gear assembly that is configured to convert a torque transmitted thereto from the input shaft to an output torque.

8. The disconnector assembly according to claim 1, further comprising a cover that has a protruding portion and is arrangeable in a first orientation and a second orientation, wherein an axial force is exertable by the protruding portion onto the connector, said force changing between the first and second orientation so that, depending on the cover's orientation, the connector is displaceable between the first and second axial position; and wherein, for changing between the first and second orientation, the cover is rotatable about a rotational axis which extends non-orthogonally and parallel to the axis along which the connector is displaceable.

9. The disconnector assembly according to claim 8, wherein the protruding portion is an inwardly protruding portion.

10. A disconnector assembly for a wheel hub transmission, wherein the wheel hub transmission comprises an input shaft that is configured to receive an input torque from a drive unit the disconnector assembly comprising:

a connector that is displaceable along an axis between a first axial position, in which the connector is configured to be coupled to the input shaft for receiving a torque therefrom, and a second axial position in which the connector is configured to be decoupled from the input shaft; and a cover;

wherein the wheel hub transmission further comprises a covered portion, wherein the covered portion comprises a groove that has an upper end and a lower end, wherein an end face of the connector protrudes through an opening in the lower end of the groove, wherein an inwardly protruding portion of the cover is adapted to slide within the groove between a first orientation and a second orientation, and wherein in the second orientation, the inwardly protruding portion is in direct contact with the end face of the connector, wherein an axial force is exertable by the protruding portion onto the connector, and wherein, for changing between the first and second orientation, the cover is rotatable about a rotational axis which extends non-orthogonally and parallel to the axis along which the connector is displaceable.

11. A disconnector assembly for a wheel hub transmission, wherein the wheel hub transmission comprises an input shaft that is configured to receive an input torque from a drive unit;

the disconnector assembly comprising:

a first coupling portion that is configured to be driven by the input shaft;

a connector having a second coupling portion and being axially displaceable between a first axial position and a second axial position, wherein each of the first and second coupling portions has at least two engagement sections extending from the respective coupling portion, and at least one disengagement section is positioned between the at least two engagement sections, wherein the at least one disengagement section comprises a ring-shaped groove that circumferentially extends between the first coupling portion and second coupling portion, wherein the engagement sections of the first and second coupling portions engage each other when the connector is in the first axial position; and wherein, when the connector is in the second axial position, at least one engagement section of the first and second coupling portions is received in the disengagement section of the respective other of the first and second coupling portion.

* * * * *